United States Patent [19]

Röckert

[11] Patent Number: 6,035,200
[45] Date of Patent: Mar. 7, 2000

[54] SYSTEM OF COMMUNICATING UNITS AND A METHOD IN SAID SYSTEM

[75] Inventor: Anders Otto Arvid Röckert, Torslanda, Sweden

[73] Assignee: Telefonaktiebolaget LM Ericsson, Stockholm, Sweden

[21] Appl. No.: 08/950,786

[22] Filed: Oct. 15, 1997

[30] Foreign Application Priority Data

Oct. 16, 1996 [SE] Sweden .................................. 9603801

[51] Int. Cl.⁷ .................................................. H04Q 7/20
[52] U.S. Cl. ........................ 455/453; 455/445; 455/560; 370/351; 370/356
[58] Field of Search .................................. 455/445, 453, 455/422, 517, 560; 370/216, 217, 218, 238, 351, 352, 355, 356

[56] References Cited

U.S. PATENT DOCUMENTS

| | | | |
|---|---|---|---|
| 3,856,993 | 12/1974 | Closs et al. | 370/458 |
| 4,276,637 | 6/1981 | Le Dieu | 370/217 |
| 4,503,533 | 3/1985 | Tobagi et al. | 370/445 |
| 4,638,476 | 1/1987 | Acampora et al. | 370/421 |
| 5,105,420 | 4/1992 | Ardon et al. | 370/216 |
| 5,227,775 | 7/1993 | Bruckert et al. | 340/825.25 |
| 5,357,559 | 10/1994 | Kallin et al. | 455/449 |
| 5,377,192 | 12/1994 | Goodings et al. | 370/348 |
| 5,519,696 | 5/1996 | Willmann et al. | 370/351 |
| 5,631,897 | 5/1997 | Pacheco et al. | 370/355 |
| 5,828,666 | 3/1997 | Focsaneanu et al. | 370/351 |
| 5,835,727 | 12/1996 | Wong et al. | 370/351 |

FOREIGN PATENT DOCUMENTS

| | | |
|---|---|---|
| 3829206 | 3/1990 | Germany . |
| 9400960 | 1/1994 | WIPO . |
| 9604763 | 2/1996 | WIPO . |

*Primary Examiner*—Dwayne D. Bost
*Assistant Examiner*—Qumochien Ba Vuong
*Attorney, Agent, or Firm*—Burns, Doane, Swecker & Mathis, L.L.P.

[57] ABSTRACT

In a system (BS2) of communicating units a message (308) is transmitted from a transmitting unit (301) to a resource group comprising at least two resource units (303). The content of the message (308) is to be handled by one of the resource units 303. The invention solves the problem of achieving a desired load distribution over the resource units (303) without delay or congestion. The message (308) is transmitted to all resource units (303), causing all units to start receiving the message (308). A load distributor (304) selects one of the resource units (303) to handle the message (308) and the other resource units (303) interrupt the reception. The system may be, for example, a base station (BS2) connected to an exchange in a mobile communication system, the transmitting unit being a transceiver unit (301) and the resource units being X.25 units (303) handling X.25 links (103) for communication with the exchange. The transceiver unit (301) transmits a message (308) to all the X.25 units (303). The X.25 unit (303) selected by the load distributor (304) forwards the content of the message (308) to the exchange, while the other X.25 units (303) ignore the content of the message (308).

26 Claims, 9 Drawing Sheets

SYSTEM OF COMMUNICATING UNITS AND A METHOD IN SAID SYSTEM

TECHNICAL FIELD

The present invention relates to a system of communicating units with a device for distributing a load over a number of resource units comprised in a resource group in the system. The invention also comprises a method to be used in a system of said kind.

STATE OF THE ART

A system for mobile communication comprises base stations, each of which comprises a number of transceiver units, which handle radio communication with mobile stations in the system. Information transmitted/received via radio is communicated between a transceiver unit in a base station and a switch to which the base station is connected. In the base station there is a number of so called X.25 units, each of which handles an X.25 link for communication with the switch. To avoid any of the X.25 units being overloaded because of uneven load distribution over the X.25 units, the base station comprises a control unit which provides load distribution over the X.25 units. Information from a transceiver unit going to the switch is transmitted in a message to the control unit, which selects one of the X.25 units and forwards the message to the selected X.25 unit. The selected X.25 unit then transmits the information to the switch through the X.25 link handled by this X.25 unit.

A problem with the above mentioned solution is that the control unit, having a limited capacity, constitutes a bottleneck and also causes a delay, especially in times of high traffic load.

U.S. Pat. No. 5,227,775 describes a system with base stations and remote units, in which transmissions from a number of the remote units to one of the base stations are co-ordinated to reduce the number of collisions arising because several of the remote units are transmitting at the same time on one incoming channel to the base station. The co-ordination is based on the base station transmitting an inhibition signal which, when any of the remote units transmits a message, puts all other remote units in a state where they are unable to transmit.

U.S. Pat. No. 5,357,559 discloses a cellular mobile telephony system with cells organized in umbrella cells and micro cells. The micro cells under a certain umbrella cell listen to the control channel of the umbrella cell in the uplink direction and measure the signal strength in a call from a mobile station. The most suitable cell, either one of the microcells or the umbrella cell, is selected to handle the call.

U.S. Pat. No. 4,638,476 describes a technique for dynamic allocation of resources in a communication system. In the communication system, several users share one channel. In order to provide good protection against fading in the channel, normally long channel codes are used for transmission on the channel. In periods when the need for transmission capacity is high shorter channel codes are used, enabling the transmission of more information on the channel albeit with a reduced protection against fading. In a terminal intended for use in the system the selection of channel code is controlled by a unit called rate controller, which supervises the degree of activity on a bus in the terminal and selects a channel code in dependence of the degree of activity.

SUMMARY OF THE INVENTION

The present invention attacks the problem, in a system in which the content of a message transmitted from a transmitting unit is to be handled by a resource unit in a resource group comprising several resource units, of achieving a desired load distribution over the resource units in the resource group.

The invention solves the above mentioned problem through a method and an arrangement in which the message is transmitted to all the resource units. A load distributor then selects at least one of the resource units and informs the resource units about which one of the resource units has been selected. The resource units handle the content of the message in different ways depending on whether or not the resource unit was selected.

In somewhat more detail the above mentioned problem is solved by the transmitting unit transmitting the message through a system internal communication network to the resource units in the resource group. Each of the resource units perceives the message as addressed to itself and initiates reception of the message. The load distributor is also connected to the communication network and perceives the message as a message for which the load distributor is to select at least one of the resource units. The load distributor selects one of the resource units and transmits control signals through a transmission medium to the resource units, comprising information about which one of the resource units has been selected. The handling of the message by the resource units depends on whether or not the resource unit in question has been selected or not. According to a typical case, the resource units that were not selected choose to ignore the content of the transmitted message, while the selected resource unit uses the content of the message, for example, to forward parts of the content of the message through a communication link to a system external unit.

An object of the invention is to achieve a desired load distribution over the resource units in the system.

Another object is to achieve the load distribution without causing bottlenecks in the system because of the load distribution, which when the load increases could cause an increased delay in the system.

Yet another object is to achieve the load distribution without introducing any delay at all in the system because of the load distribution.

An advantage of the invention is that load distribution is achieved without any bottleneck in the system being caused by the load distribution and therefore there is no risk that the load distribution is achieved at the cost of an increasing delay in the system when the load increases.

Another advantage of the invention is that the load distribution can be achieved without any delay of the information caused by the load distribution when transmitting to the resource unit that is to handle the information. This is of great value in applications that are sensitive to delays, such as transmission of speech in real time.

The invention will be described in more detail in the following, with reference to the appended drawings.

DESCRIPTION OF PREFERRED EMBODIMENTS

Figure 1:
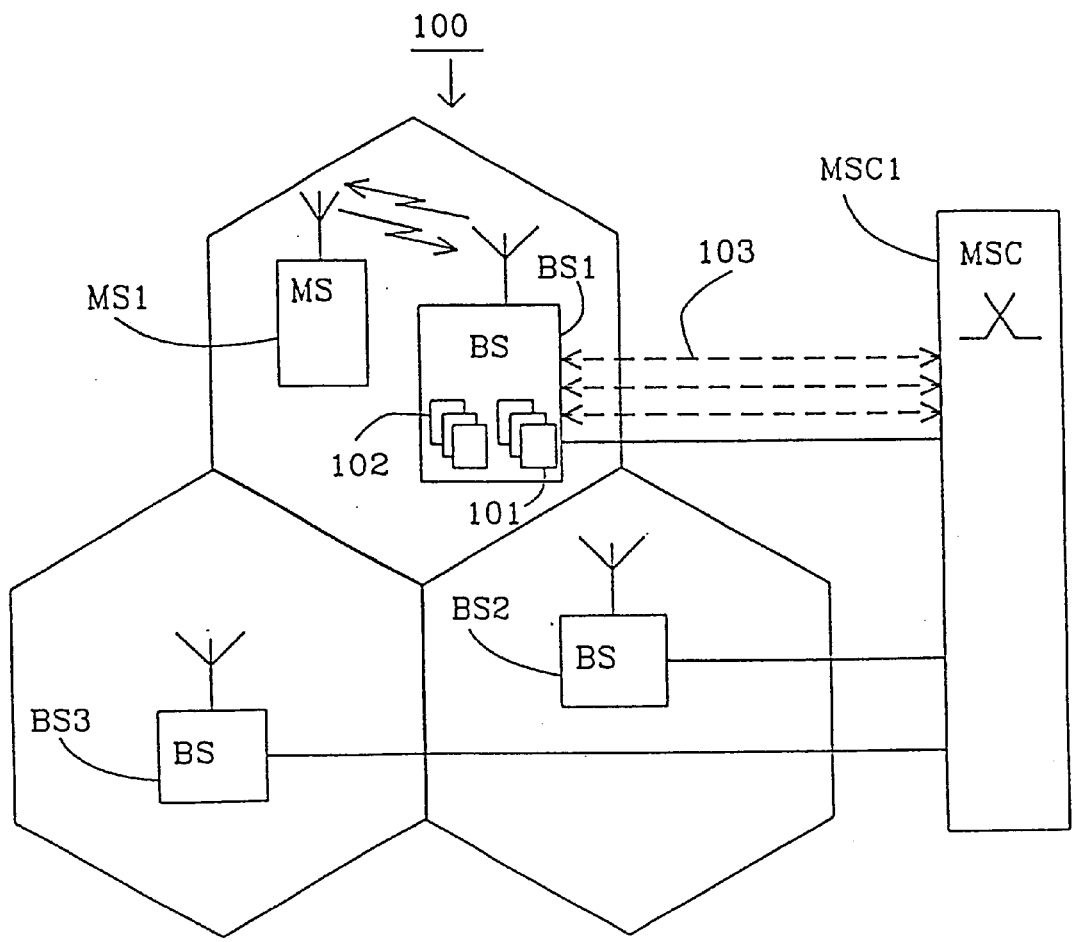
FIG. 1 shows a view of a mobile communication system.

FIG. 1 shows a part of a system 100 for mobile communication. A user of the mobile communication system 100 communicates by means of a mobile station MS1. Base stations BS1–BS3 in the mobile communication system 100 provide radio coverage in the area served by the system 100. The mobile station MS1 communicates by means of radio signals with the base station BS1 providing radio coverage in the area, or cell, in which the mobile station is currently located. Each of the base stations BS1–BS3 comprises a number of transceiver units 101–102, divided in a first group and a second group, which provide transmission/reception of radio signals. The base stations BS1–BS3 in the system 100 are connected to an exchange (Mobile Services Switching Centre) MSC1. The exchange MSC1 is responsible for connecting calls to/from the mobile station MS1 in the area covered by the base stations BS1–BS3 connected to the exchange MSC1. In addition to speech communication (telephony), the mobile communication system offers data communication to the user. In the base stations BS1–BS3, for speech communication one of the transceiver units 102 in the first group is used, whereas for data communication one of the transceiver units 101 in the second group is used. User information transmitted to or received by the transceiver units 101 belonging to the second group is communicated between the base station BS1 and the exchange MSC1 to which the base station BS1 is connected, through so called X.25 links 103. In the following, the term transceiver unit will be taken to mean one of the transceiver units 101 in the second group.

Figure 2:
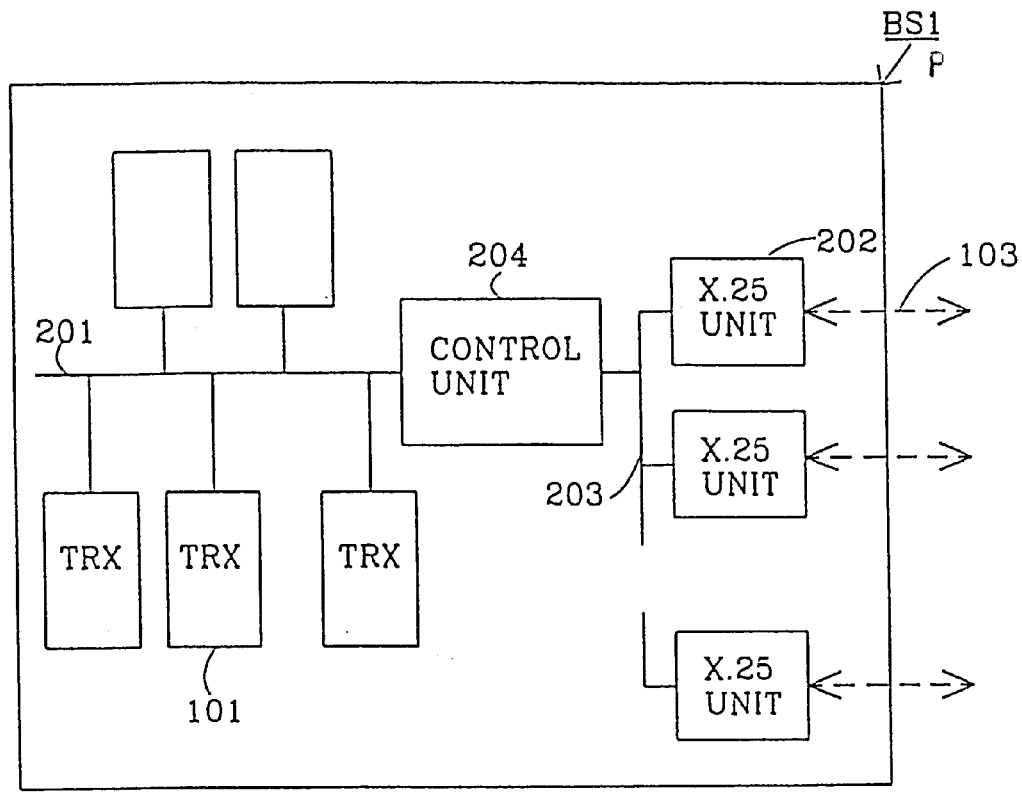
FIG. 2 is a schematic block diagram of a base station according to prior art.

FIG. 2 shows, schematically, a block diagram of the base station BS1 according to an embodiment known in the art. The transceiver units 101 (TRX) of the base station 101 are connected to a first serial bus 201. In the base station BS1 there are a number of X.25 units 202, each of which handles one of the X.25 links 103 for communication with the exchange MSC1. The X.25 units 202 in the base station BS1 are connected to a second serial bus 203. A control unit 204 is connected to both buses 201, 203.

When one of the transceiver units 101 receives user information from the mobile station MS1, the transceiver unit sends a message comprising this user information through the first bus 201 to the control unit 204. The control unit 204 selects one of the X.25 units 202 and forwards the message to the selected X.25 unit 202 through the second bus 203. The X.25 unit 202 in turn forwards the user information to the exchange MSC1 in a message through the X.25 link 103 handled by the X.25 unit 202. The control unit 204 distributes the load over the different X.25 units 202 using a so called round robin method, which means that the messages are distributed cyclically to the X.25 units in turn.

A message from the exchange MSC1 comprising user information and the address of the transceiver unit 101 that is to transmit the user information to the mobile station MS1, is received through one of the X.25 links 103 by the X.25 unit 202 handling the X.25 link 103 in question. The content of the received message is forwarded by the X.25 unit 202 in a message transmitted through the second bus 203 to the control unit 204. From the content of the message, the control unit 204 reads the address of the transceiver unit 101 that is to handle the information and forwards the message to the transceiver unit 101 through the first bus 201.

One problem with the solution described above is that since all messages between the transceiver units 101 and the X.25 units 202 are routed through the control unit 204, a delay is caused in the transmission of information between the transceiver units 101 and the X.25 units 202. Since the control unit has a limited capacity, this delay increases when the traffic load becomes heavy.

Figure 3:
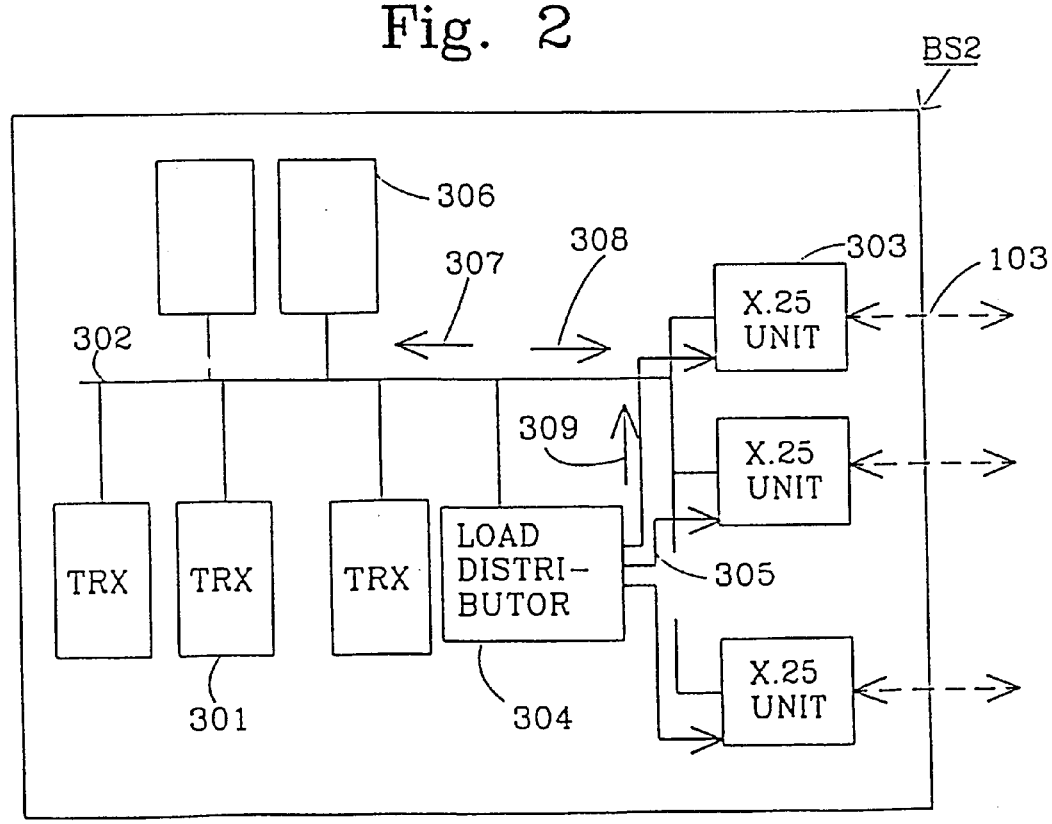
FIG. 3 is a schematic block diagram of a base station with load distribution according to the invention.

FIG. 3 shows, schematically, a block diagram of a base station BS2 where the load distribution is achieved in accordance with the present invention. In this case the transceiver units 301 of the base station BS2 are connected to the same serial bus 302 as the X.25 units 303 of the base station BS2. There is also a separate load distributor 304 connected to the bus 302. Each of the X.25 units 303 is connected to the load distributor 304 through an individual connection 305.

A message from the exchange MSC1 comprising user information and the address of the transceiver unit 301 that is to transmit the user information to the mobile station MS1, is received through one of the X.25 links 103 by the X.25 unit 303 handling the X.25 link 103 in question. The X.25 unit 303 derives from the message the address of the transceiver unit 301 that is to handle the information and forwards the user information to the transceiver unit 301 in question in a message 307 through the bus 302.

The user information received by one of the transceiver units 301 from the mobile station MS1, is transmitted by the transceiver unit 301 in a message 308 through the bus 302 with an address that is common to all X.25 units 303. Thus, each of the X.25 units 303 will perceive the message 308 as addressed to itself and initiate the reception of the message 308. The load distributor 304 monitors all traffic on the bus 302 and when it recognizes a message 308 with the address common to the X.25 units, selects one of the X.25 units 303 to handle the message in question 308. The load distributor then transmits control signals 309 to the X.25 units 303 that have not been selected, ordering them to ignore the content of the message 308 in question. This order is given through the individual connections 305 corresponding to each of the X.25 units 303 that have not been selected. The X.25 units 303 that have not been selected interrupt the reception and ignore the content of the message 308 in question, while the selected X.25 unit 303 forwards the user information in the message 308 to the exchange MSC1 in a message through the X.25 link 103 handled by the X.25 unit 303. Besides the transceiver units 301, the X.25 units 303 and the load distributor 304, further units 306 may be connected to the bus 302.

Figure 4:
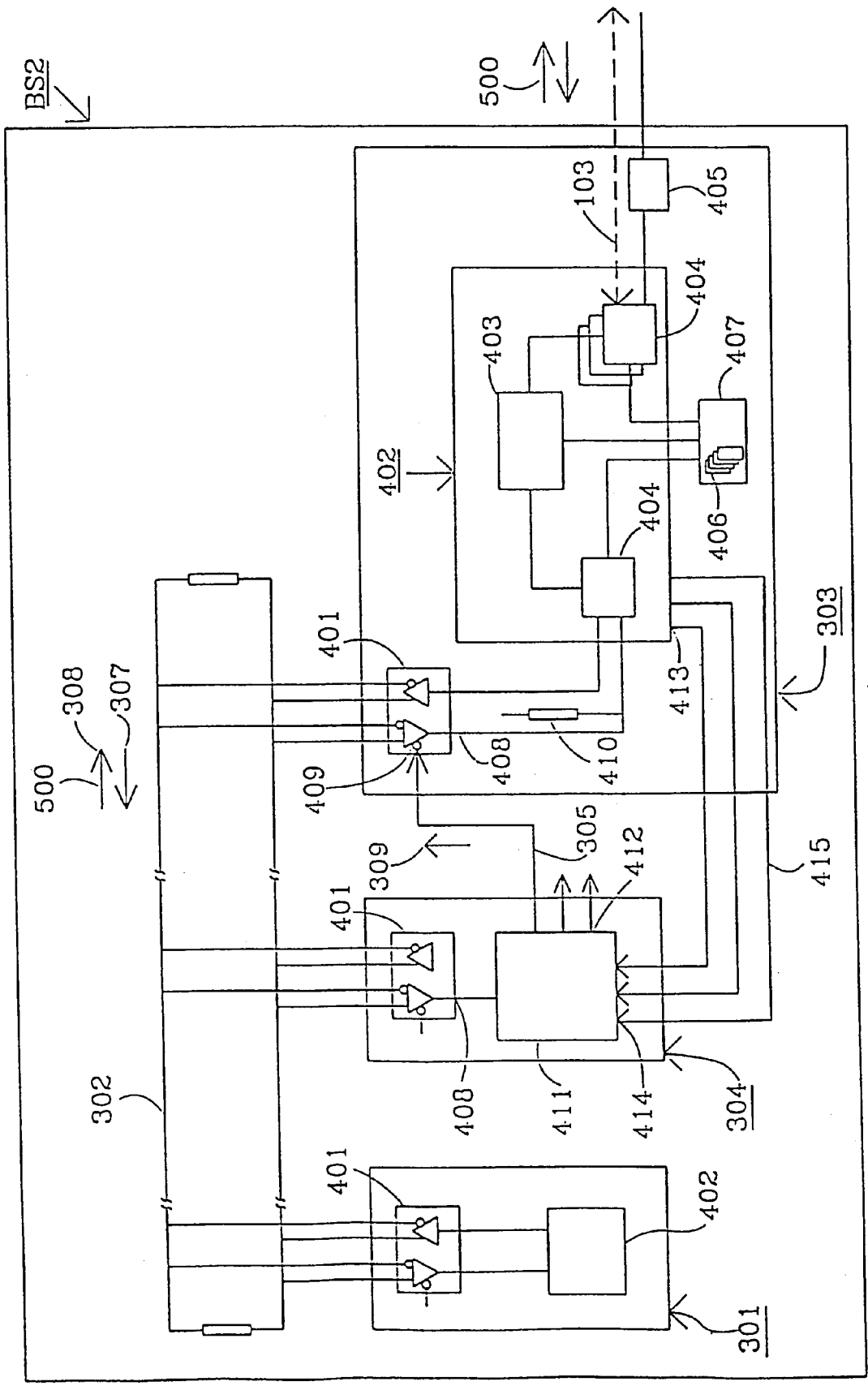
FIG. 4 is a block diagram in somewhat more detail of parts of the base station according to FIG. 3.

FIG. 4 shows, in somewhat more detail, how one of the transceiver units 301, the load distributor 304 and one of the X.25 units 303 in the base station BS2 are connected to the serial bus 302.

Figure 5:
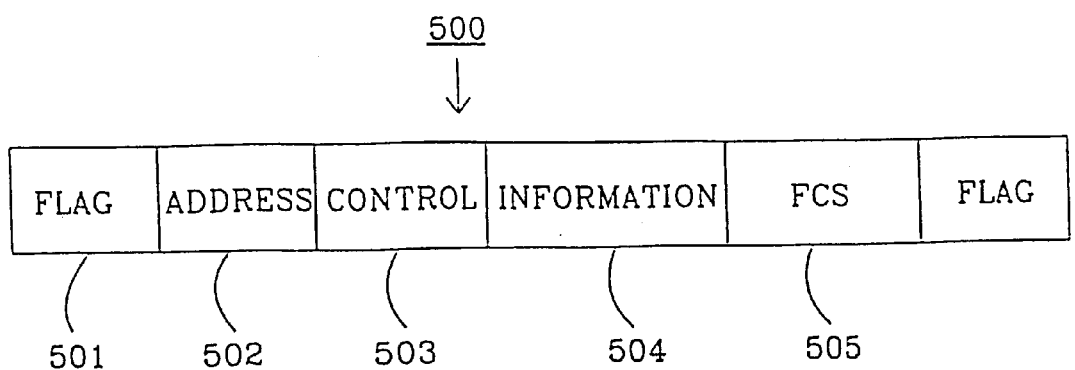
FIG. 5 is a block diagram of the frame format in HDLC.

The transceiver unit 301, the load distributor 304 and the X.25 unit 303 are connected to the bus 302 by means of one transceiver circuit 401 each, which in the exemplifying embodiment is of the make SN75176. Signal transmission between the transceiver circuits 401 connected to the bus 302 is achieved in the exemplifying embodiment according to the standard EIA RS-485. Message transmission between the transceiver units 301 and the X.25 units 303 is achieved according to a protocol based on the High-level Data Link Control (HDLC) protocol, well known in the art. The messages 307–308 sent internally in the base station BS2 through the serial bus 302 are thus made up of HDLC frames with a format as shown in FIG. 5.

An HDLC frame 500 starts and ends with a flag 501. Between these flags 501 there is an address field 502, a control field 503, an information field 504 and a checksum field called "Frame Check Sequence" 505 (FCS). The flags 501 define the beginning and the end of a frame. The address field 502 in a frame 500 controls which one of the units connected to the bus 302 that is to receive the frame 500 in question. An address "7F" (hexadecimal) is in this case the common address for the X.25 units 303, that is, a frame 500 with the address "7F" will be received by each of the X.25 units 303. Information to be transmitted or that has been received through one of the X.25 links 103 is carried in the information field 504.

The X.25 unit 303 is based on a control circuit 402, which in this exemplifying embodiment is a Motorola MC68360 "QUad Integrated Communications Controller". Said control circuit 402 comprises, among other things, a main processor 403 and four Serial Communication Controller (SCC) units 404. One of the SCC units 404 is connected to the transceiver circuit 401 of the X.25 unit 303 and handles communication on the serial bus 302. This first SCC unit 404 is configured to function as an HDLC communication circuit and handles transmission/reception of HDLC frames 500 (see FIG. 5) practically without interacting with the main processor 403. The other SCC units 404 are connected to a physical interface 405 for communication with the exchange MSC1 (see FIG. 1) and each handles an X.25 link 103. Said physical interface 405 transmits data according to the ITU standard G.703 and is in the exemplifying embodiment implemented using two circuits from Philips, of the makes PE82235 and PE82035, respectively. The message transmission on the X.25 links 103 is done according to a well known standardized protocol called Link Access Procedure-Balanced (LAPB), which is a variant of HDLC, and thus the SCC units 404 handling the X.25 links 103 are also configured to function as HDLC communication circuits and transmit and receive HDLC frames 500.

When the first SCC unit 404 receives an HDLC frame 500 on the serial bus 302, the content of this HDLC frame 500 is stored in a message buffer 406 in a memory 407 connected to the control circuit 402, until the entire HDLC frame 500 has been received, and an interrupt is then generated to the main processor 403. The main processor 403 retrieves the content of the message buffer 406 from the memory 407 and at this point discovers that there is user information to be forwarded on one of the X.25 links 103. The main processor 403 selects one of the X.25 links 103 and stores the user information in a new message buffer 406 in the memory 407. The main processor 403 then orders the SCC unit 404 handling the selected X.25 link 103 to use the content in the last mentioned message buffer 406 to assemble an LAPB/HDLC frame 500 and transmit it on the selected X.25 link 103 to the exchange MSC1.

When an LAPB/HDLC frame 500 is received on one of the X.25 links 103, the frame 500 is received by the SCC unit 404 handling the X.25 link 103 in question. The content of the frame 500 is stored in a message buffer 406 in the memory 407 until the whole frame 500 has been received. An interrupt is then generated to the main processor 403. The main processor 403 retrieves the content of the message buffer 406 from the memory 407 and discovers that there is user information to be forwarded to one of the transceiver units 301. The main processor 403 extracts the address of the transceiver unit 301 in question from the content of the message buffer 406 and stores this address together with user information to be transmitted to the transceiver unit 301 in a new message buffer 406 in the memory 407 and orders the first SCC unit 404 to use the content of the last mentioned message buffer 406 to assemble an HDLC frame 500 and transmit it on the serial bus 302.

The mechanism that enables the load distributor 304 to order the X.25 unit 303 to ignore the content of an HDLC frame 500 that is being received on the serial bus 302, uses the possibility specified in HDLC for a unit transmitting an HDLC frame 500 to abort this frame 500 by transmitting an abort sequence of at least 7 ones in a row, which results in the receiving unit ignoring the frame 500 in question. The receiver output 408 of the transceiver circuit 401 belonging to the X.25 unit 303 can be put in a high impedance state by a high level being applied to a certain control input 409 ("Receiver Output Enable"). To the receiver output 408 a so called pull up resistor 410 is connected, which means that when the output 408 is in its high impedance state the first SCC unit 404 connected to the receiver output 408 will detect a high level. The load distributor 304 is connected to said control input 409 of the transceiver circuit 401 belonging to the X.25 unit 303 through one of the previously mentioned individual connections 305. When the load distributor 304 is to order the X.25 unit 303 to ignore an HDLC frame 500 during reception, the load distributor 304 applies a high level to the above mentioned control input 409 during a time period corresponding to eight bit periods. The receiver output 408 of the transceiver circuit 401 will then be high during eight bit periods, which will be read by the first SCC unit 404 connected to the transceiver circuit 401 as a sequence of eight ones and which in turn will be interpreted by the first SCC unit 404 as the transceiver unit 301 having aborted the HDLC frame 500 in question. The first SCC unit 404 is configured to generate no interrupt when an HDLC frame 500 has been aborted. Therefore, the main processor 403 of the control circuit 402 never becomes aware of the aborted HDLC frames 500 and thus no extra load occurs in the main processor 403 in spite of the fact that a considerable number of HDLC frames 500 may be aborted.

The load distributor 304 is based on a programmable circuit 411, which in this exemplifying embodiment is an AMD MACH220, connected to the receiver output 408 of the transceiver circuit 401 belonging to the load distributor 304. Furthermore the outputs 412 of the programmable circuit 411 are connected to the previously mentioned control input 409 of the transceiver circuits 401 belonging to each of the X.25 units 303, through the above mentioned individual connections 305. In this way the load distributor 304, in the way described above, can order each of the X.25 units 303 to ignore an HDLC frame 500 received on the serial bus 302 by any one of the X.25 units.

As indicated above, each of the X.25 units 303 handles three X.25 links 103. If any of the X.25 links 103 is out of service because of an error situation, the transmission capacity of the X.25 unit is decreased. For this reason, each of the X.25 units 303 informs the load distributor 304 about how many of the X.25 links 103 are out of service at any given time. This is done through separate connections 415 going from three outputs 413 on the control circuit 402 belonging to each of the X.25 units 303 to inputs 414 of the programmable circuit 411 belonging to the load distributor 304. The connections 415 are of limited importance to the invention and thus are not described in more detail. They are also not shown in FIG. 3.

Figure 6A:
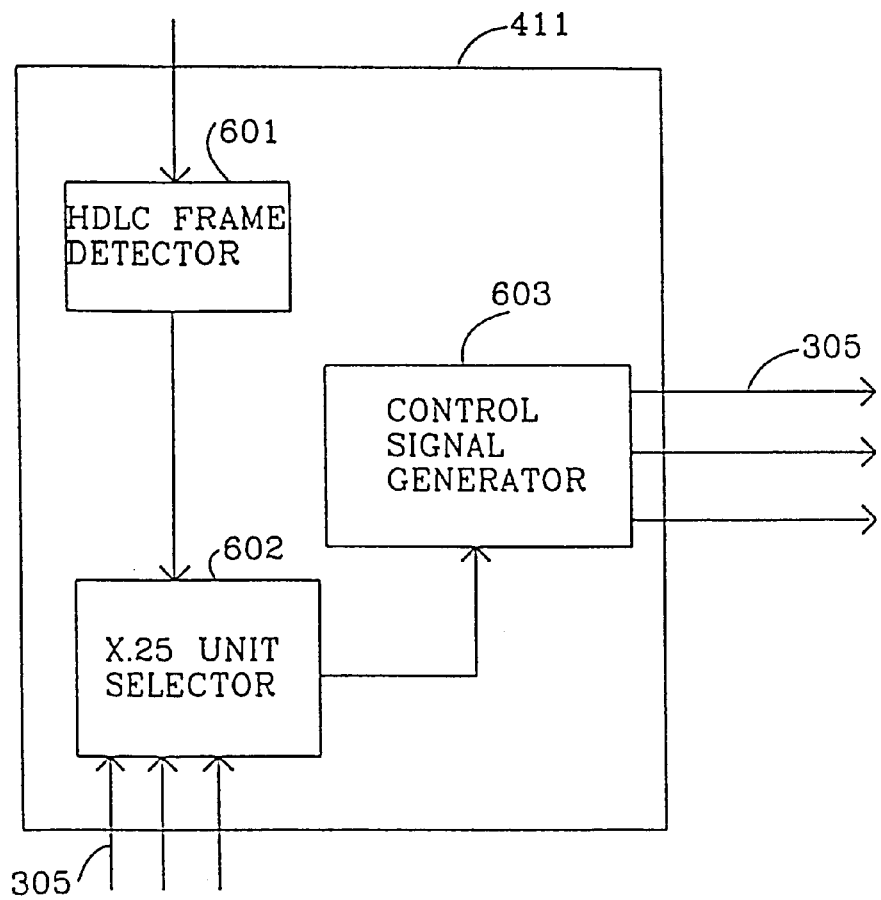
FIG. 6A is a functional block diagram of a programmable circuit in the load distributor in a base station according to FIGS. 3 and 4.
Figure 6B:
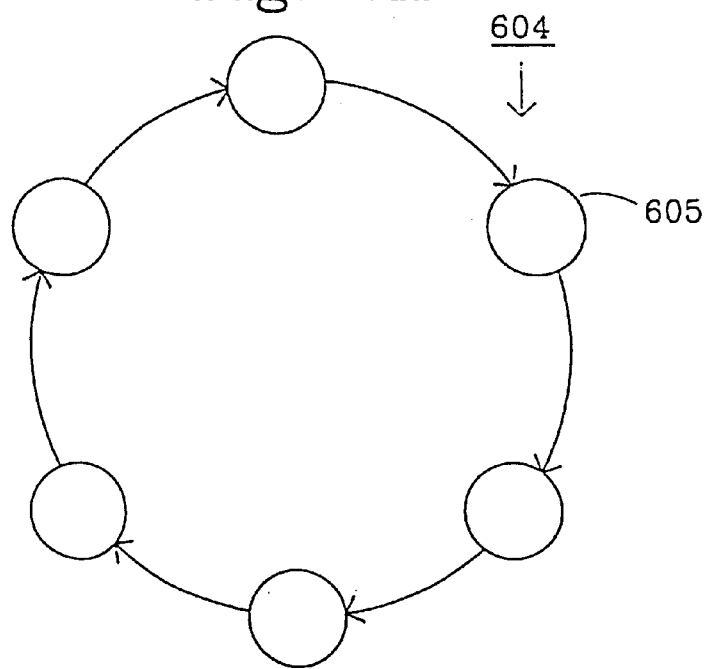
FIG. 6B is a state transitional diagram of a state machine used in the selection of an X.25 unit.

FIG. 6A shows a functional division of the programmable circuit 411 into function blocks. A function block HDLC frame detector 601 recognizes HDLC frames 500 (see FIGS. 5 and 4) for which load distribution is to be performed. When a new HDLC frame 500 is detected, which is labelled with the address "7F" which is common to the X.25 units 303, a signal is generated to a function block 602 called X.25 unit selector. The latter function block comprises a state machine 604, which is illustrated in FIG. 6B. Each state 605 in the state machine 604 represents one of the X.25 links 103 and the states are connected in a closed circle. Each of the states 605 is associated with information about whether or not the X.25 link 103 corresponding to the state is in service, and which one of the X.25 units 303 handles the link 103 in question. When the X.25 unit selector 602 receives the above mentioned signal from the HDLC frame detector 601, the selector 602 steps the state machine 604 to the next state 605 corresponding to one of the X.25 links 103 in service. The X.25 unit 303 handling the X.25 link 103 corresponding to said state 605 is selected. The X.25 unit selector 602 orders a function block 603 called control signal generator in FIG. 6A to order all X.25 units 303 that have not been selected to ignore the HDLC frame 500 in question. The control signal generator 603 normally applies a low level to all X.25 units 303 through the above mentioned individual connections 305. When the control signal generator 603 receives an order from the X.25 unit selector 602 to order one of the X.25 units 303 to ignore an HDLC frame 500, this is done by, as previously described, applying a high level to the X.25 unit 303 during a period of time corresponding to eight bit periods, whereafter the control signal generator 603 again will apply a low level to the X.25 unit 303.

Figure 6C:
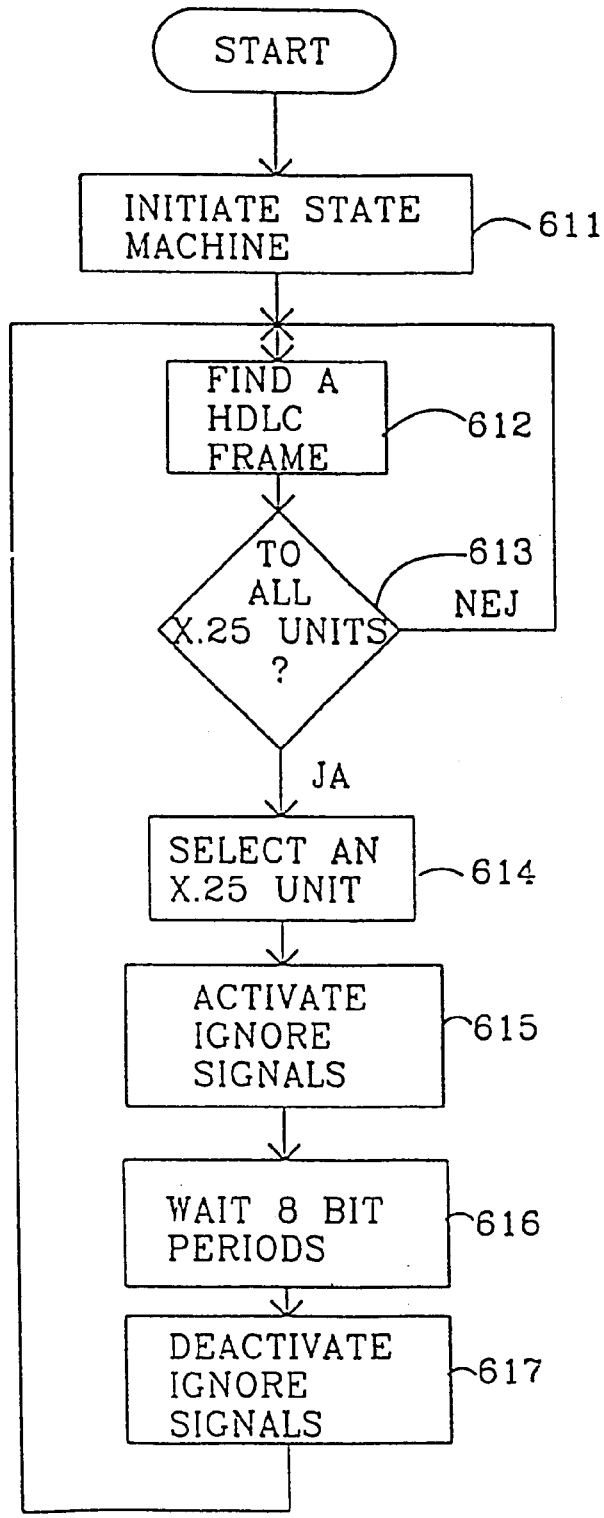
FIG. 6C is a flow chart describing the function of the load distributor in a base station according the FIGS. 3 and 4.

A complementary description of the function of the load distributor 304 is given in the flow chart in FIG. 6C. When the load distributor 304 is connected to the bus 302 and thus is activated, the previously mentioned state machine 604 is initiated in step 611. In step 612 the bus 302 is monitored until the beginning of an HDLC frame 500 is detected, that is, an HDLC flag 501 (see FIG. 5) is found. In step 613 the content of the address field 502 of the HDLC frame 500 is analyzed to determine whether or not the frame 500 in question is labelled with the address "7F", common to the X.25 units 303. If the frame 500 does not have the common address (result NO), the load distributor returns to step 612 to look for the beginning of the next HDLC frame 500. If, on the other hand, the frame 500 is addressed to all the X.25 units 303 (result YES), then in step 614 one of the X.25 units 303 is selected to handle the HDLC frame 500 in question. The selection is made in the way described in connection with FIG. 6B. In step 615 ignore signals (high level) are activated towards all the X.25 units 303 that have not been selected. The load distributor 304 then waits in step 616 for a period of time corresponding to eight bit periods before it deactivates the ignore signals (low level) in step 617. The load distributor 304 returns to step 612 to look for a new HDLC frame 500.

The unit referred to as a load distributor 304 in FIGS. 3 and 4 perform a number of additional functions regarding supervision and control in the base station BS2 and also comprises a considerable number of circuits in addition to the ones shown in FIG. 4. These functions are, however, of no significance when describing the present invention and, therefore, are not described in more detail. In the same way, each of the transceiver units 301 comprise a considerable number of circuits (for example, transmitter/receiver) in addition to the transceiver circuit 401 for connection to the serial bus 302 and a control circuit 402, but as the only function performed by the transceiver unit 301 when describing the invention is to transmit and receive HDLC frames 500 on the serial bus 302, the transceiver unit 301 is also not described in more detail.

Figure 7:
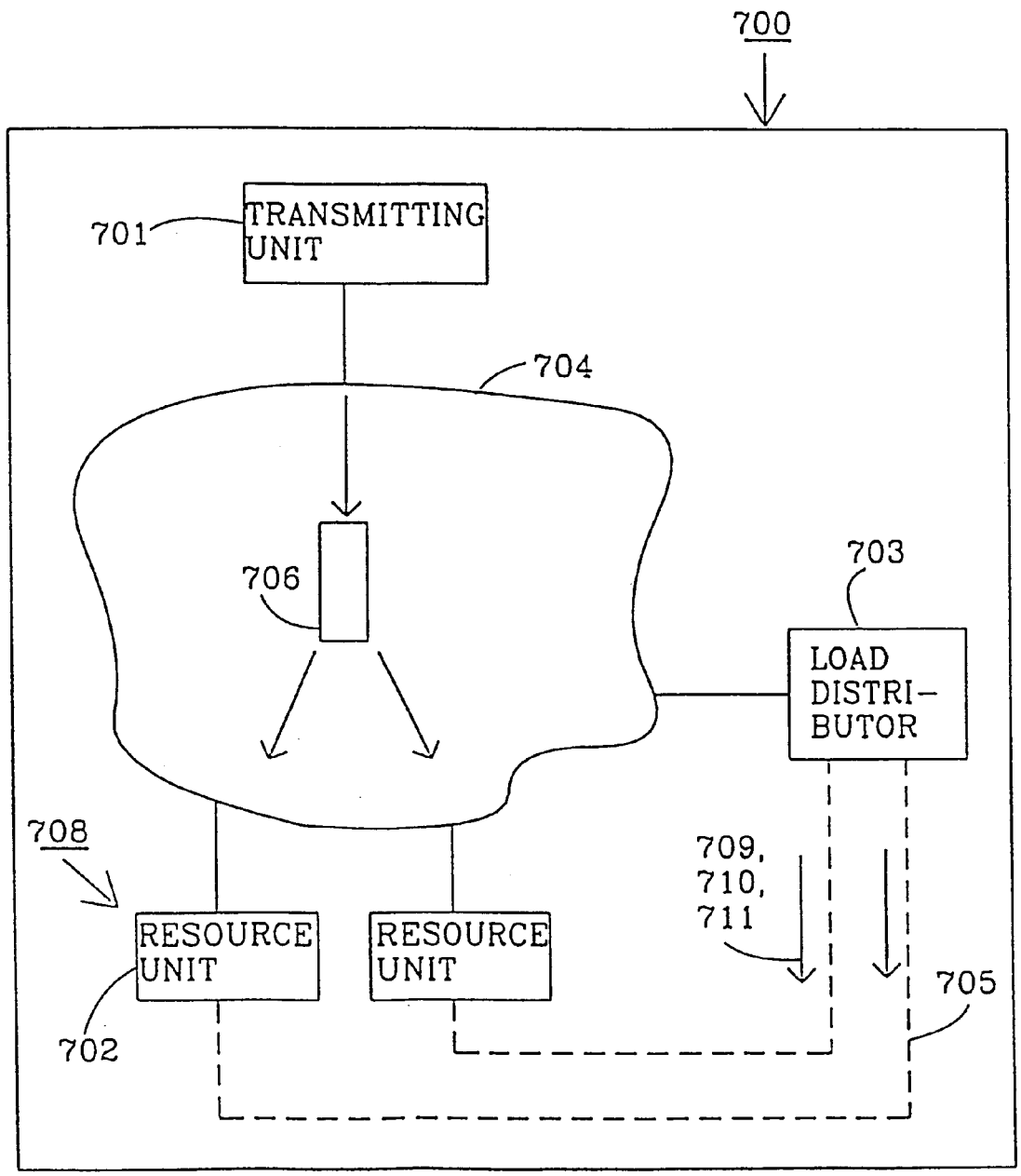
FIG. 7 is a block diagram of a system with the inventive load distribution over resource units in a resource group.

FIG. 7 illustrates an inventive system 700 expressed in general terms. The system 700 comprises at least one transmitting unit 701, at least one resource group 708 comprising at least two resource units 702 and a load distributor 703, all of which are connected to a system internal communication network 704. The system also comprises a transmission means 705 intended to transmit control signals 709 from the load distributor 703 to the resource units 702 in the resource group 708.

The transmitting unit 701 transmit messages 706 to the resource units 702 in the resource group 708. The system internal communication network 704 is arranged for transmitting said messages 706 serially between the transmitting unit 701 and the resource units 702. For at least one selected message 706 of said messages all resource units 702 in the resource group 708 are each arranged for registering the selected message 706 as addressed to itself, so that all resource units 702 initiate the reception of the selected message 706. The load distributor 703 is arranged for registering the selected message 706 and selecting, for the selected message 706, according to a predetermined rule such as round robin, at least one of the resource units 702. The load distributor 703 emits control signals 709 to the resource units 702 in the resource group 708 comprising information about said selection, said control signals being transmitted between the load distributor 703 and the resource units 702 through the previously mentioned transmission means 705. The resource units 702 are arranged for performing predetermined actions in connection with the selected message 706 in dependence of said control signals 709.

Figure 8:
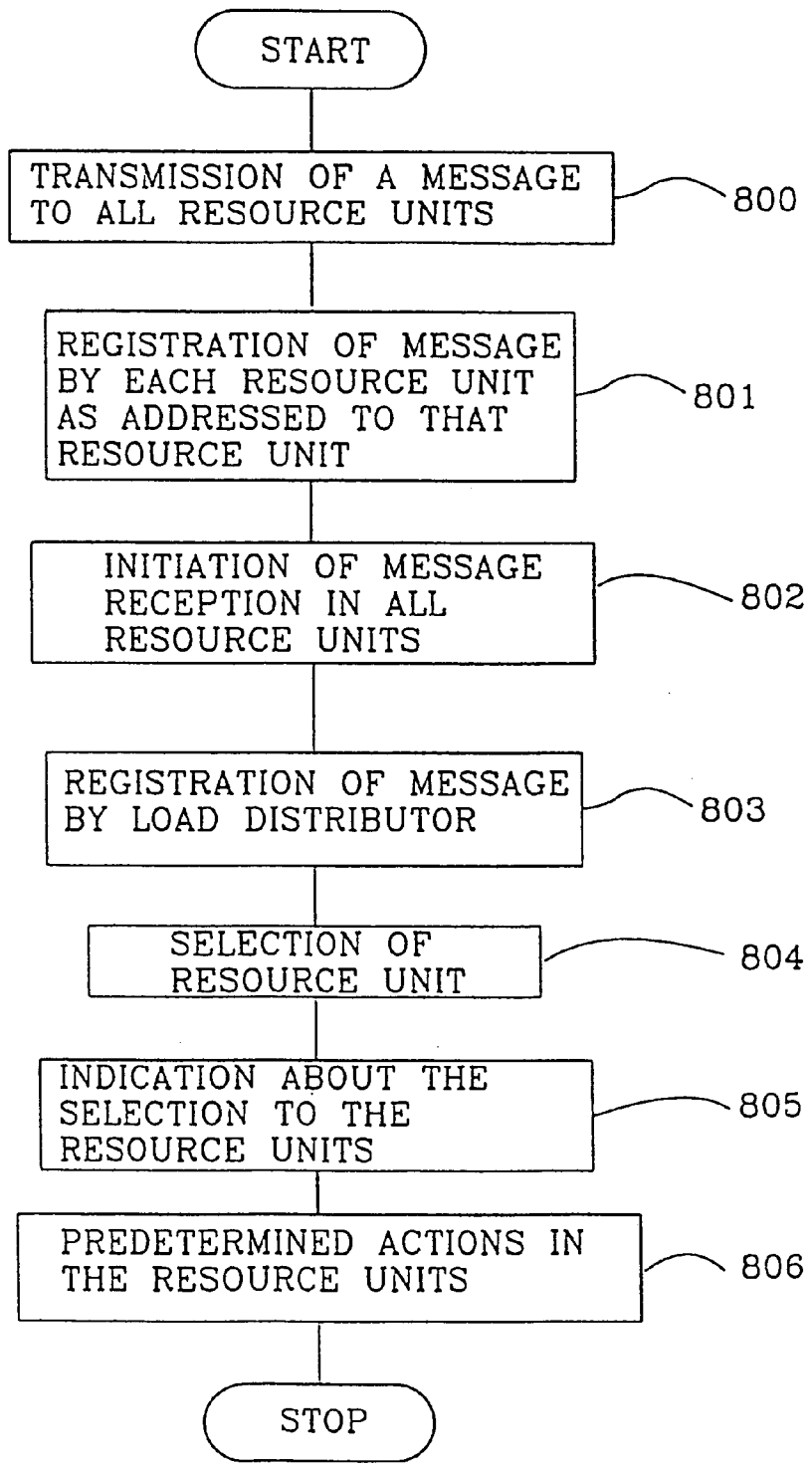
FIG. 8 is a flow chart describing an inventive method.

FIG. 8 illustrates, in a flow chart, the inventive method for load distribution in a system 700 according to FIG. 7.

At step 800 a message 706 is sent from the transmitting unit. At step 801, this message 706 is registered by each of the resource units 702 in the resource group 708 as addressed to that resource unit, and at step 802 all resource units 702 thus initiate reception of the message 706. The load distributor 703 registers the message 706 at step 803 and selects, at step 804, at least one of the resource units 702 for this message. At step 805 the load distributor indicates to the resource units 702 in the resource group 708 which at least one of the resource units 702 has been selected. At step 806 the resource units 702 perform predetermined actions in connection with the message 706 and in dependence of the previously mentioned indication of which at least one of the resource units 702 has been selected.

Of course the resource units 702 in FIG. 7 can handle different types of communication links, such as X.25 or frame relay for communication with system external units. The resource units 702 can, however, handle other types of resources than communication links as well. One example of this is in a system 700 in which the resource units 702 handle a database which has been duplicated to a number of resource units 702 to enhance its performance.

The above mentioned predetermined actions performed in connection with the selected message 706 by the resource units 702, are determined by the type of resources handled by the resource units. Usually, regardless of resource type, the resource units 702 that have not been selected ignore the content of the selected message 706. The actions taken in the selected resource unit 702 may comprise, for example, as in the embodiment according to FIG. 3, forwarding parts of the message content. In the example of the duplicated database, the selected message 706 comprises a search query, in which the selected resource unit 702 finds an answer to the question asked and returns the answer in a message to the transmitting unit 701.

The load distributor 703 in FIG. 7 can use different principles when selecting a resource unit, depending on what principle is best suited for the system 700 in question. Usually the load distributor 703 only selects one of the resource units 702 in the resource group 708 to handle the content of the selected message 706, but of course the load distributor 703 could select more than one of the resource units 702 if this is desirable in the system 700.

A simple load distribution principle is to select the resource units 702 in turn according to a round robin method. Another example of a feasible load distribution principle, if the different resource units 702 are not all identical, but have different capacities, is to distribute a heavier load to the resource units 702 having a higher capacity. In the embodiment described in connection with FIG. 4, a combination of the two above mentioned load distribution principles is used. If none of the X.25 links 103 is out of service, the load is distributed according to a pure round robin method. If any of the X.25 links 103 is out of service, the load is distributed over the X.25 units 303 in proportion to the transmission capacity of each of the X.25 units 303 relative to the other X.25 units 303. Another example of a load distribution principle is to divide the messages 706 and the resource units 702 into priority levels and reserve some of the resource units 702 for handling the content of messages 706 having a high priority, while the remaining resource units 702 are left to handle the content of the messages 706 having a lower priority.

Depending on the principle used for load distribution, the need of the load distributor 703 to understand the content of the message varies from merely recognizing a new message 706 to using one or more data fields in the selected message 706 when selecting the resource unit 702 to handle the message 706 in question. The load distributor 304 used in the embodiment shown in FIG. 4 recognized HDLC flags 501 and the address "7F" common to all X.25 units 303, indicating that the load distributor 304 is to select one of the X.25 units 303 to handle the HDLC frame 500 in question.

Typically, when selecting one of the resource units 702, knowledge about selections made in connection with the previously selected messages 706 is used. In the embodiment shown in FIG. 4 the load distributor 304 uses a state machine 604 (see FIG. 6B) when selecting X.25 units 303 and thus utilizes knowledge about previously made selections of resource units 702. It is, however, also possible to use a load distribution principle in which the selection of the resource unit 702 to handle the content of a selected message 706 is based solely on the content of the message in question 706 without considering how previous selections of resource units 702 have been made.

In certain situations the transmitting unit 701 may have to transmit a sequence of messages 706 that are all to be handled by the same resource unit 702. One way of handling such a situation is to include data identifying the message sequence, for each of the messages 706 in the sequence, and to let the load distributor 703 select the same resource unit 702 for all messages 706 in the sequence. Another way of handling this situation is to, for the first message in the sequence, let the load distributor 703 select one of the resource units 702. This selected resource unit 702 transmits a reply message to the transmitting unit 701 comprising the unique address of the resource unit, and the transmitting unit 701 then uses this unique address to address all the following messages in the sequence directly to the selected resource unit 702.

In the system 700 different types of communication networks 704 may be used. The communication network 704 must provide the possibility of transmitting the selected message 706 so that all resource units 702 in the resource group 708 initiate the reception of the selected message 706. Furthermore, the load distributor 703 must also be able to register the selected message 706, for which one of the resource units 702 is to be selected. Examples of other types of communication networks that may be used in connection with the invention instead of the serial RS-485 bus with an HDLC based protocol used in FIG. 4, are networks of so called Ethernet and token ring type.

The transmission means 705 may, as shown in FIG. 3, be made up of separate individual connections 305. It is, however, also possible to use other types of transmission means 703. For example, it is possible, if the system internal communication network 704 is made up of a broadband bus, to reserve a frequency band in the broadband bus for transmission of the control signals 709 to the resource units 702.

The load distributor 703 is preferably arranged for informing the resource units 702 about which one of the resource units 702 has been selected, by means of said control signals 709, before any of the resource units 702 has received the whole selected message 706.

The control signals 709 from the load distributor 703 may, according to one example, comprise ignore signals 710, which are sent to the resource units 702 that have not been selected and explicitly informs them that they have not been selected. Each of the resource units 702 receiving one of said ignore signals 710 is arranged for interrupting the reception of the selected message 706 and for ignoring the content of the message 706.

The control signals 709 from the load distributor 703 may also, according to another example, comprise a handling signal 711, which is sent to the selected resource unit 702 and explicitly informs it that it has been selected. When the entire selected message 706 has been received the resource unit 702 that has received the handling signal 711 uses the content of the selected message 706. The resource units 702 that, after having received the entire selected message 706, have not received the handling signal 711, ignore the content of the selected message 706.

If it is difficult to make sure that the load distributor 703 has time to inform all the resource units 702 about which resource unit 702 has been selected before any of the resource units 702 has received the entire selected message 706, the resource units 702 may be arranged for awaiting the reception of a control signal 709 from the load distributor 703, explicitly telling whether or not the resource unit 702 has been selected. The load distributor emits the above mentioned handling signal 711 to the selected resource unit 702, and the above mentioned ignore signals 710 to the resource units 702 that were not selected. In case the resource unit 702 receives the handling signal 711, the resource unit 702 uses the content of the selected message 706. In case the resource unit 702 receives one of the ignore signals 710, the resource unit 702 ignores the content of the selected message 706.

There are several different solutions to how the resource units 702 that have not been selected can be made to ignore the content of the selected message 706. Some of these solutions are shown in FIGS. 9A–9C.

Figure 9A:
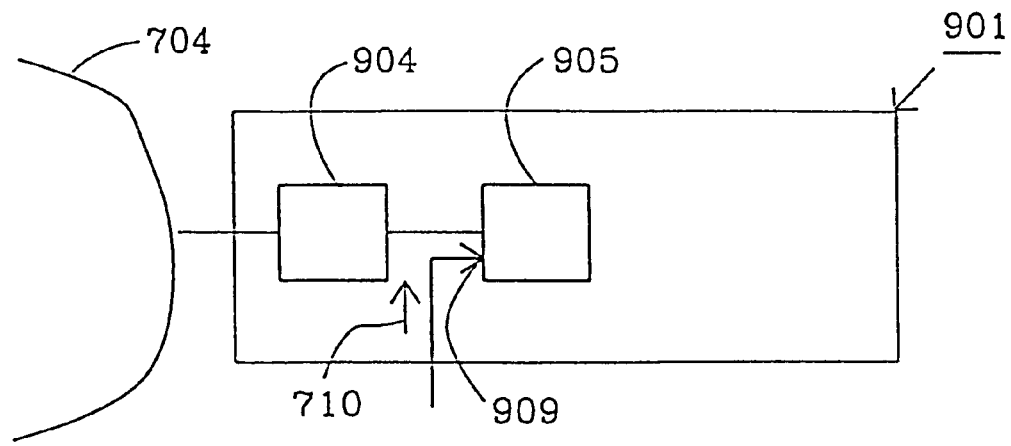
FIG. 9A is a schematic block diagram of a resource unit with a communication circuit with a control input for receiving an ignoring signal.

FIG. 9A shows a resource unit 901 with a circuit 904 handling the physical connection to the system internal communication network 704. A communication circuit 905 supervising the message reception is connected to the connection circuit 904. The communication circuit 905 is developed especially to enable it to be ordered explicitly to ignore the selected message and provided with a control input 909. When one of the above mentioned ignore signals 710 is received on the control input 909, the communication circuit 905 interrupts the reception of the selected message 706 and the resource unit 901 ignores the content of the selected message 706.

Figure 9B:
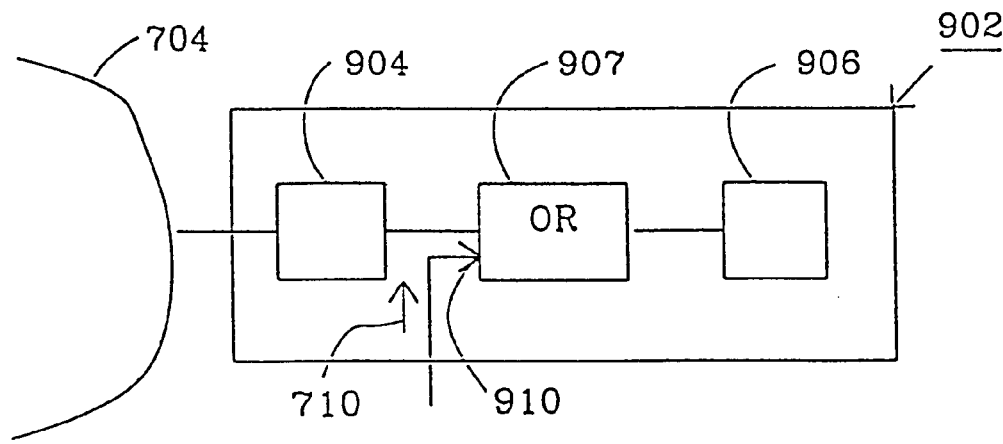
FIG. 9B is a schematic block diagram of a resource unit with a distortion means in the form of an OR gate.
Figure 9C:
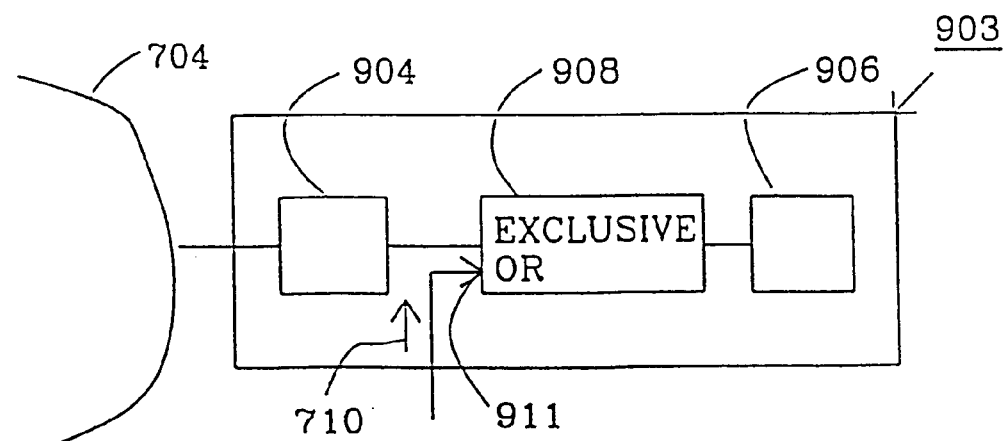
FIG. 9C is a schematic block diagram of a resource unit with a distortion means in the form of an Exclusive OR gate.

FIG. 9B shows a resource unit 902 also provided with a connection circuit 904 and in this case a standard communication circuit 906. The communication circuit 906 in this case handles message reception according to a protocol based on HDLC. The connection circuit 904 is connected to a first input of an OR gate 907. The communication circuit 906 is connected to the output of the OR gate 907. The OR gate 907 functions as a distortion means, which is activated when one of the above mentioned ignore signals 710 is received on another input 910 to the OR gate 907.

Figure 10A:
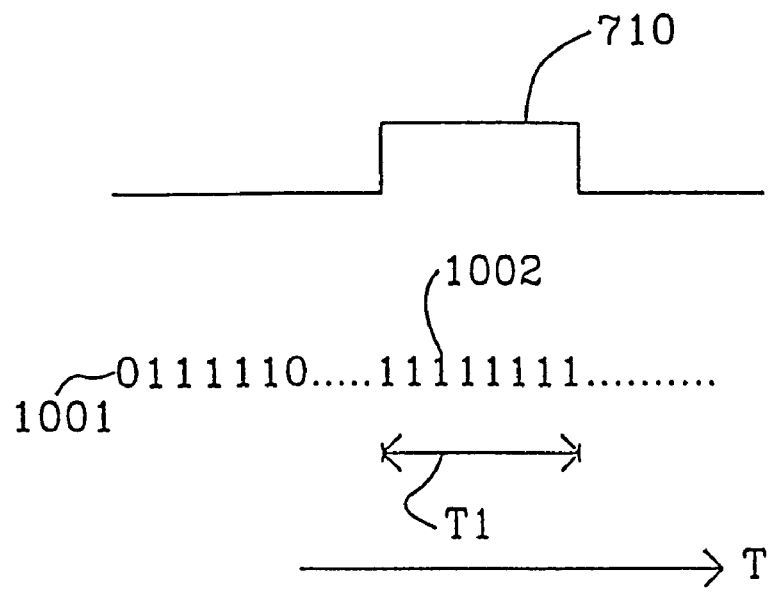
FIG. 10A shows, in a time diagram, an ignoring signal and a bit sequence after the OR gate in a resource unit according to FIG. 9B.

FIG. 10A shows the ignore signal 710 in a time diagram, in which time is indicated by a T. The diagram shows how the ignore signal 710 isin this case made up of a high level during a time interval T1 corresponding to at least 7 bit periods. FIG. 10A also shows the bit sequence 1001 received by the communication circuit 96 in connection with the selected message 706. During the time interval T1 in which the ignore signal 710 is active, the communication circuit 906 will read a sequence of at least 7 ones in a row, which will be perceived by the communication circuit 906 as an abort sequence 1001, and the communication circuit 906 will then interrupt the reception of the selected message 706 and the resource unit 902 will ignore the selected message 706.

FIG. 9C shows a resource unit 901, which differs from the resource unit 902 in FIG. 9B only in that the OR gate 907 has been replaced by an exclusive OR gate 908. One of the previously mentioned ignore signals 710 is in this case received by a second input 911 to the gate 908.

Figure 10B:
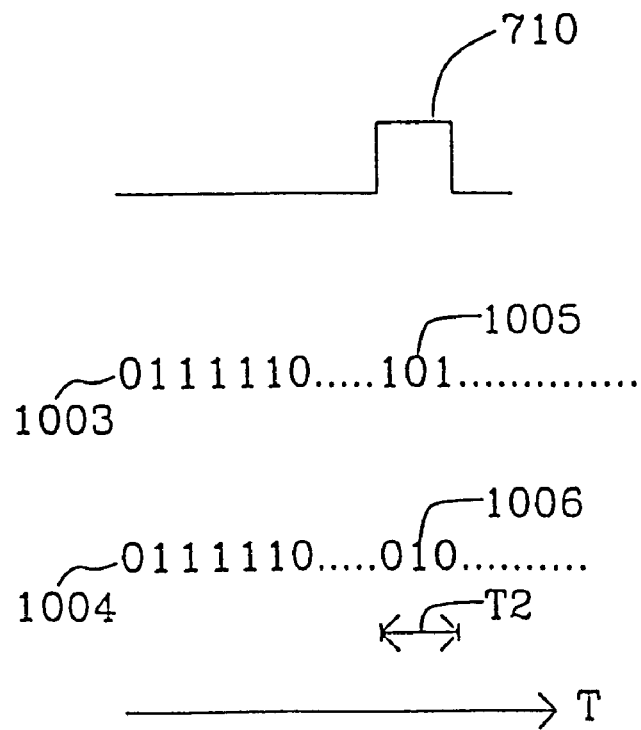
FIG. 10B shows, in a time diagram, an ignoring signal and a bit sequence before and after the Exclusive OR gate in a resource unit according to FIG. 9C.

FIG. 10B illustrates how the ignore signal 710 is in this case made up of a high level during a time interval T2 comprising only a few bit periods. FIG. 10B also illustrates the bit sequence 1003 received by the exclusive OR gate 908 from the connection circuit 904, and the bit sequence 1004 emitted from the gate 908 to the communication circuit 906 in connection with the selected message 706. During the time interval T2 when the ignore signal 710 is active, the gate 908 will emit to the communication circuit 906 a bit sequence 1006 that is inverted compared to the corresponding bits 1005 received by the gate 908 from the connection circuit 904. When the communication circuit 906 has received the entire selected message 706, the communication circuit 906 checks the bit sequence 1004 received by the communication circuit 906 against a checksum in order to check that the message has not been distorted. In this check, the communication circuit 906 discovers that the selected message 706 has been distorted, and the resource unit 906 therefore ignores the content of the selected message 706.

The resource units 702 may be embodied according to FIG. 9A regardless of the protocol used for transmission of messages between the transmitting unit 701 and the resource units 702. If an HDLC based protocol or a protocol having a sequence corresponding to the abort sequence of HDLC is used when transmitting the message, the resource units may also be embodied according to the principle shown in FIG. 9B. If the messages according to the protocol used for message transmission comprise a checksum for detection of distorted messages, the resource units 702 may also be embodied according to the principle shown in FIG. 9C.

I claim:

1. A system (700, BS2) of communicating units (701, 702, 301, 302), said system comprising
    at least one transmitting unit (701, 701) arranged for transmitting messages (706, 308),
    at least one resource group (708) comprising at least two resource units (702, 303) arranged for receiveing said messages (706, 308),
    a system internal communication network (704, 302) to which the transmitting unit (701, 301) and the resource units (702, 303) in the resource group (708) are connected, said communication network (704, 302) being arranged for transmitting said messages (706, 308) serially between the transmitting unit (701, 301) and the resource units (702, 303),
    a load distributor (703, 304) connected to the system internal communication network (704, 302)
    characterized in that
    the system (700, BS2) further comprises transmission means (705, 305) for transmitting control signals (709, 309) from the load distributor (703, 304) to the resource units (702, 303) in the resource group (708),
    for at least one selected message (706, 308) of said messages (706, 308) each resource unit (702, 303) is arranged for registering said selected message (706, 308) as addressed to itself and initiating reception of said selected message (706, 308),
    the load distributor (703, 304) is arranged for registering the selected message (706, 308) and for said message (706, 308) according to a predetermined rule, selecting at least one of the resource units (702, 303),
    the load distributor (703, 304) is also arranged for emitting control signals (709, 309) to the resource units (702, 303) in the resource group (708) comprising information about said selection, said control signals (709, 309) being transmitted from the load distributor (703, 304) to the resource units (702, 303) through said transmission means (705, 305),
    each of the resource units (702, 303) in the resource group is arranged for performing predetermined actions in connection with the selected message (706, 308), in dependence of said control signals (709, 309).

2. A system according to claim 1, characterized in that the load distributor (703, 304) is arranged for selecting one and only one of the resource units (702, 303).

3. A system (700, BS2) according to claim 1,
characterized in that the resource units (702, 303) that are not selected are arranged for ignoring the content of the selected message (706, 308).

4. A system according to claim 1,
characterized in that the load distributor (703, 304) is arranged for informing the resource units (702, 303) through said control signals (709, 309) about which at least one of the resource units (702, 303) has been selected, before any of the resource units (702, 303) has received the entire selected message (706, 308).

5. A system according to claim 4,
characterized in that said control signals (709, 309) comprise ignore signals (710, 309) to the resource units (702, 303) that are not selected, each of the resource units (702, 303) receiving one of the ignore signals (710, 309) being arranged for interrupting the reception of the selected message (706, 308) and ignoring the content of the message (706, 308).

6. A system according to claim 4,
characterized in that said control signals (709) comprise a handling signal (711) to the selected resource unit (702),
each of said resource units (702) being arranged for, after receiving the entire selected message (706), using the content of the selected message (706) in the case when the resource unit (702) has received the handling signal (711) and in the opposite case ignoring the content of the selected message (706).

7. A system according to claim 1,
characterized in that said control signals (709) from the load distributor (703) comprise both ignore signals (710) to the resource units (702) that have not been selected, and a handling signal (711) to the selected resource unit (702),
each of the resource units (702) being arranged for, in the case when it receives the handling signal (711), using the content of the selected message (706), and in the case when it receives one of the ignore signals (710), ignoring the content of the selected message (706).

8. A system (700, BS2) according to claim 1, wherein transmission and reception of said messages take place according to a certain protocol and the resource units (902, 903, 303) are provided with means (906, 404) for supervision of message reception,
characterized in that at least one of the resource units (303) comprises a distortion device (907, 908), which, when said control signals (710, 309) from the load distributor (703, 304) indicate that the resource unit (902, 903, 303) has not been selected, is arranged for distorting the selected message (706, 308) so that the content of the distorted message according to said protocol will be ignored, the means (906, 404) for supervision of the message reception detecting that the content of the selected message (706, 308) is to be ignored and the resource unit (902, 903, 303) ignoring the content of the message.

9. A system (700, BS2) according to claim 8,
characterized in that said protocol comprises an abort sequence, said distortion device (907) being arranged for distorting the selected message (706, 308) so that the means (906, 404) supervising the message reception registers the abort sequence (1002) and interrupts the reception of the selected message (706, 308).

10. A system (700) according to claim 8,
characterized in that the messages in said protocol comprise a checksum (505) for detection of distorted messages, said distortion device (908) being arranged for distorting the selected message so that the means (906) supervising the message reception, when checking the checksum (505) of the selected message (706), discovers that the message has been distorted.

11. A system (700, BS2) according to claim 1,
characterized in that said transmission means (705, 305) comprises individual connections (305) between the load distributor (703, 304) and each respective resource unit (702, 303).

12. A system (700, BS2) according to claim 1,
characterized in that the system internal communication network (704, 302) is based on a bus topology.

13. A system (700, BS2) according to claim 1,
characterized in that each of the resource units (702, 303) handles at least one communication link (103) for communication with at least one system external unit (MSC1) and that the selected resource unit (702, 303) transmits at least part of the content of the selected message (706, 308) to the system external unit (MSC1) on one of the communication links (103) handled by the selected unit (702, 303).

14. A system (700, BS2) according to claim 13,
characterized in that said communication links are X.25 links (103) for communication with said system external unit (MSC1).

15. A method for load distribution in a system (700) of communicating units (701, 702), said system comprising at least one transmitting unit (701), at least one resource group (708) comprising at least two resource units (702), a system internal communication network (704) to which the transmitting unit (701) and the resource units (702) in the resource group (708) are connected and which is intended for transmission of messages (706) from the transmitting unit (701) to the resource units (702) and a load distributor (703) connected to the communication network (704), said method comprising:

transmission (800) of a message (706) from the transmitting unit, characterized in that the method further comprises:
registration (801) of the message (706) by each resource unit (702) as a message addressed to that resource unit (702),
initiation (802) of message reception in all resource units (702) in the resource group (708),
registration (803) of the message (706) by the load distributor (703),
selection (804) in the load distributor (703), according to a predetermined rule, of at least one of the resource units (702) for this message,
indication (805), of which at least one of the resource units (702) has been selected, from the load distributor (703) to the resource units (702),
performance of predetermined actions (806) in the resource units (702) in connection with the message (706) and in dependence of said indication.

16. A method according to claim 15,
characterized in that one and only one of the resource units (702) is selected.

17. A method according to claim 15,
characterized in that said rule for the selection of the resource units (702) comprises selecting the resource units (702) cyclically in turn.

18. A method according to claim 15, characterized in that the resource units (702) that have not been selected ignore the content of the message (706).

19. A method according to claim 15,
characterized by performing said indication (805) to the resource units (702) of what resource unit (702) has been selected before any one of the resource units (702) has received the entire message (706).

20. A method according to claim 19,
characterized by giving said indication (805) to the resource units (702) of what resource unit (702) has been selected, in the form of ignore signals (710) to the resource units (702) that have not been selected (702), the predetermined actions performed in the resource units (702) receiving one of the ignore signals comprising:
interruption of the reception of the message (706), ignoration of the content of the message (706).

21. A method according to claim 19,
characterized in that said indication (805) to the resource units (702) of which at least one of the resource units (702) has been selected is given in the form of a handling signal (711) to the selected resource unit (702), the resource unit (702) receiving the handling signal (711) using the content of the message (706), while the other resource units (702) decides to ignore the content of the message (706) when the entire message (706) has been received.

22. A method according to claim 15,
characterized in that said indication (805) to the resource units (702) of which at least one of the resource units (702) has been selected is given in the form of both a handling signal (711) to the selected resource unit (702) and ignore signals (710) to the resource units (702) that were not selected, the resource unit (702) receiving the handling signal (711) using the content of the message (706) while the resource units (702) receiving the ignore signals (710) ignore the content of the message (706).

23. A method according to claim 15, wherein transmission and reception of messages are performed according to a certain protocol,
characterized in that at least one of the resource units (702) that have not been selected is made to ignore the content of the message (706) through distortion of the message (706) so that according to said protocol, the content of the distorted message is to be ignored, said resource unit (702) after detecting the distorted message, ignoring the content of the message (706).

24. A method according to claim 23,
characterized in that the protocol used comprises an abort sequence (1002), said at least one of the resource units (902) that have not been selected being made to ignore the content of the message (706) through distortion of the message (706) so that the resource unit (902) will detect the abort sequence (1002) and interrupt the reception of the message (706).

25. A method according to claim 23,
characterized in that messages in said protocol comprise a checksum (505) for detection of distorted messages, at least one of the resource units (903) that were not selected being made to ignore the content of the message (706) through distortion of the message (706) so that the resource unit (903) detects, when checking the checksum (505) of the message, that the message has been distorted.

26. A method according to claim 15,
characterized in that said predetermined actions performed in the selected resource unit (702, 303) comprise the transmission of at least part of the content of said message (706, 308) to a system external unit (MSC1) on an external communication link (103) handled by the selected resource unit (702, 303).

* * * * *